United States Patent [19]

Baldwin

[11] Patent Number: 4,971,384
[45] Date of Patent: Nov. 20, 1990

[54] ADJUSTABLE COVER ASSEMBLY FOR AN AUTOMOBILE VEHICLE

[76] Inventor: David L. Baldwin, 336 NW. 2nd St., Pompano Beach, Fla. 33060

[21] Appl. No.: 438,237

[22] Filed: Nov. 20, 1989

[51] Int. Cl.$^5$ ............................................. B60J 11/00
[52] U.S. Cl. ..................................... 296/98; 296/136; 135/88; 135/903
[58] Field of Search ...................... 296/98, 99.1, 95.1, 296/136; 135/88, 106, 108, 903

[56] References Cited

U.S. PATENT DOCUMENTS

| | | | |
|---|---|---|---|
| 1,079,205 | 11/1913 | Beebe | 296/98 |
| 1,157,115 | 10/1915 | McIntyre | 135/903 X |
| 1,471,279 | 10/1923 | Raggis | 135/88 |
| 1,523,350 | 1/1925 | Raggis | 135/88 |
| 2,508,757 | 5/1950 | Gray | 135/88 |
| 3,952,758 | 4/1976 | Addison et al. | 135/106 X |

FOREIGN PATENT DOCUMENTS

| | | | |
|---|---|---|---|
| 798110 | 5/1936 | France | 135/88 |
| 608465 | 9/1960 | Italy | 135/88 |
| 438980 | 12/1967 | Switzerland | 296/136 |
| 1530699 | 11/1978 | United Kingdom | 296/136 |

Primary Examiner—Margaret A. Focarino
Assistant Examiner—Gary C. Hoge
Attorney, Agent, or Firm—Oltman and Flynn

[57] ABSTRACT

A cover assembly for a car comprising a flexible roll-up cover and a positioning arrangement for the cover. The positioning arrangement includes a roller on which the cover can be wound and rear and front sleeves that can be mounted on the car to extend horizontally from side to side above the car at its rear and front ends. Each sleeve slidably receives extension tubes that can be slid out laterally. The flexible cover has a central top segment which extends between the rear and front sleeves, front, back and side flap segments which hang down from the top segment, and an end segment connecting the top segment to the roller so that the entire cover can be wound on the roller. The side flap segments carry straps at their front and rear edges with VELCRO hook-and-loop fastener elements. When the side flap segments hand down the straps attach them to the front and back flap segments. When the side flap segments are raised, the straps attach them to the extension tubes to provide lateral extensions of the top segment.

7 Claims, 3 Drawing Sheets

ADJUSTABLE COVER ASSEMBLY FOR AN AUTOMOBILE VEHICLE

SUMMARY OF THE INVENTION

This invention relates to a cover assembly for an automotive vehicle.

A principal object of this invention is to provide a novel cover assembly having a flexible cover for enclosing a passenger car over the top, across the front and back, and along the sides.

Another object of this invention is to provide such a cover assembly which is convertible to uncover the sides of the car and extend the cover at the top laterally on either side of the car.

Preferably, the cover assembly of the present invention comprises a flexible, sheet-like cover of suitable fabric or plastic and a cover positioning arrangement including:

(a) rear posts extending up from the rear bumper on opposite sides of the car;

(b) a manually operable roller supported by the rear posts at a level above that of the roof of the passenger compartment of the car;

(c) a rear support sleeve supported by the rear posts and extending horizontally from one side of the car to the opposite side a short distance in front of the roller;

(d) extension members slidably received in the rear support sleeve and extensible laterally from it on each side of the car;

(e) front posts extending up from the front bumper on opposite sides of the car;

(f) a front support sleeve supported by the front posts and extending horizontally from side to side at the same level as the rear support sleeve; and (g) extension members slidably received in the front support sleeve and extensible laterally from it on each side of the car.

The cover has:

(a) a rectangular central top segment which can extend between the rear and front sleeves to cover the top of the car from end to end and from side to side;

(b) a front flap segment attached to the front end of the top segment and adapted to hang down from it across the front of the car;

(c) a back flap segment attached to the rear end of the top segment and adapted to hang down from it across the rear of the car;

(d) opposite side flap segments attached to the top segment between the front and back flap segments and adapted to hang down from the top segment along the opposite sides of the car;

(e) an end segment joined to the top segment above the back flap segment and connected to the roller; and (f) VELCRO hook-and-loop fasteners on the side, front and rear flap segments enabling the side flap segments to be attached to the front and rear flap segments when all of them hang down from the top segment, forming a generally rectangular enclosure for the car, and enabling the side flap segments (when detached from the front and rear flap segments) to be attached to the extension members of the cover positioning arrangement when they are laterally extended from the rear and front support sleeves, so that the side flap segments now are lateral extensions of the top segment of the cover.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
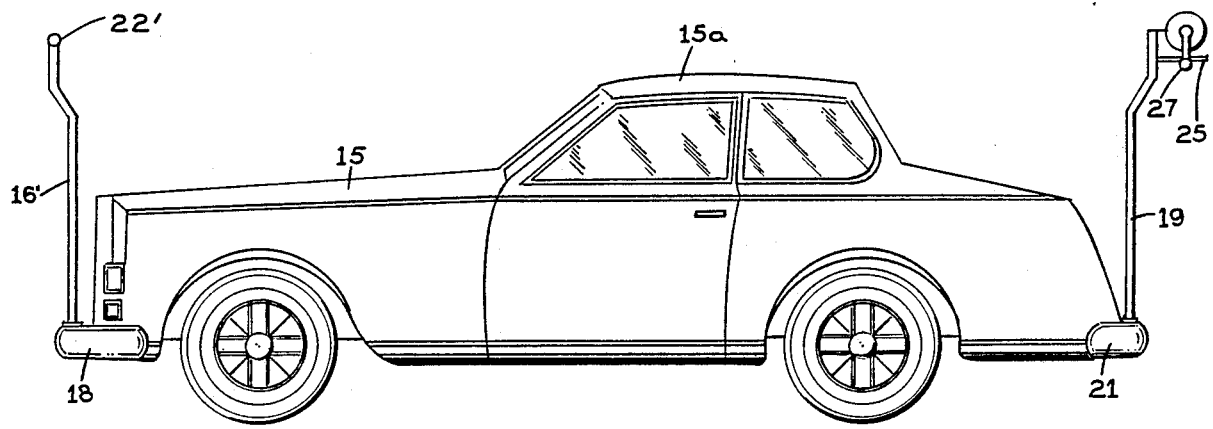
FIG. 1 is a side elevation of a car equipped with an extensible and retractable roll-up cover assembly in accordance with this invention.
Figure 2:
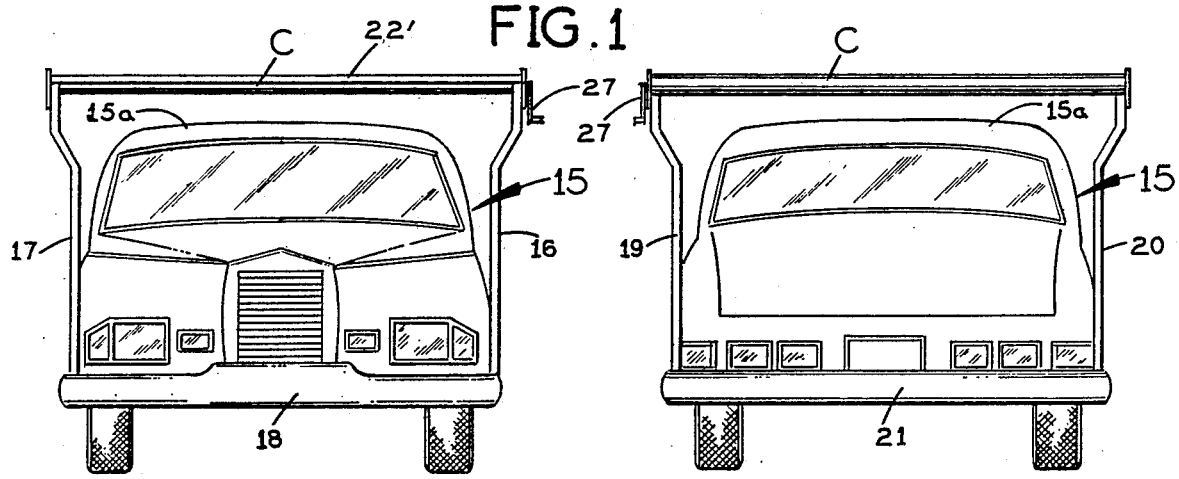
FIG. 2 is a front elevation.
Figure 3:
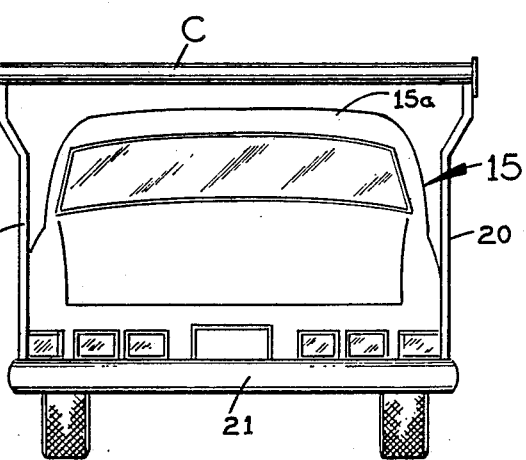
FIG. 3 is a rear elevation.
Figure 4:
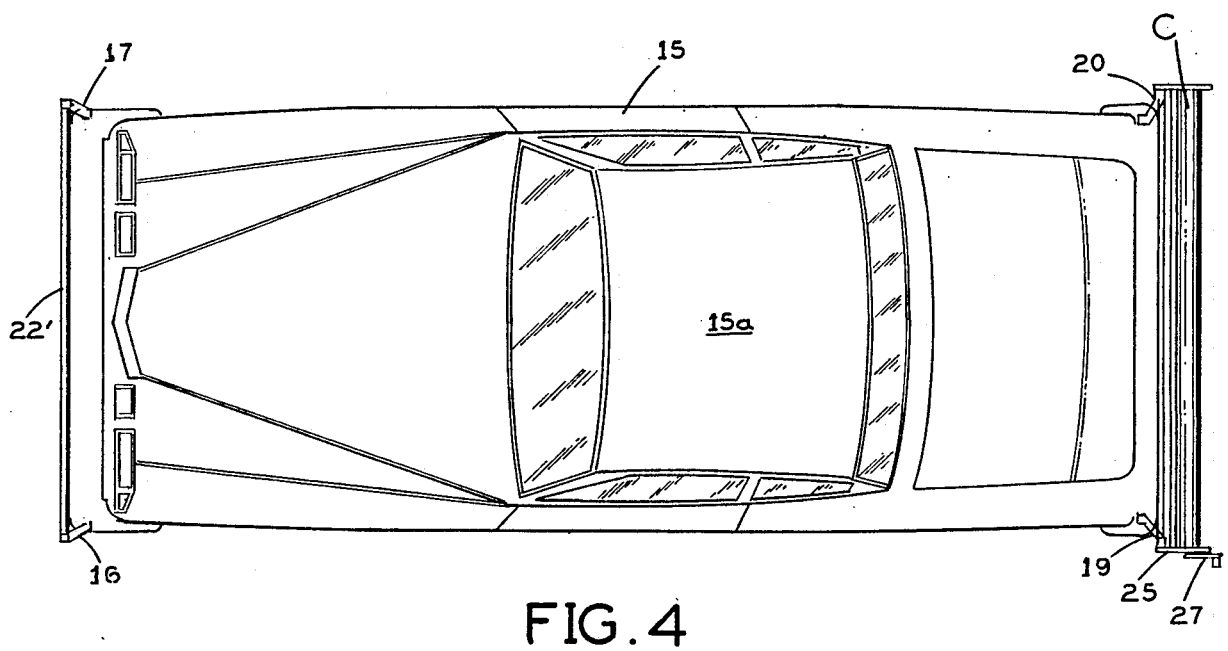
FIG. 4 is a top plan view.

Referring to FIGS. 1, 2 and 3, the cover assembly of the present invention is shown installed on a passenger car 15. A pair of front posts 16 and 17 (FIG. 2) extend up from the front bumper 18 of the car at the left and right sides, respectively. A pair of rear posts 19 and 20 (FIG. 3) extend up from the rear bumper 21 at the left and right sides, respectively. The posts 16, 17, 19 and 20 are attached to the respective bumpers either permanently or releasably in any desired manner, the details of which are not part of the present invention.

Figure 8:
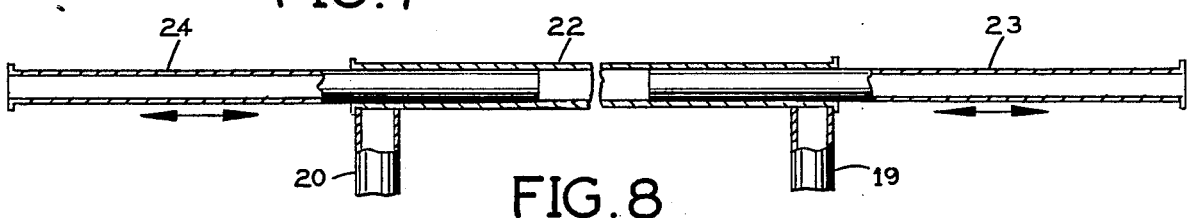
FIG. 8 is a vertical section taken longitudinally through one of the extensible cover supports extending from side-to-side at the back and at the front of the car.

A cylindrical sleeve 22 (FIGS. 5 and 8) is rigidly attached to the upper ends of the rear posts 19 and 20 and extends horizontally between them at a level higher than the roof 15a of the car (FIG. 1). Sleeve 22 slidably receives an extension member in the form of a tube 23 which can be extended laterally past the left rear post 19, as shown in FIG. 8. Similarly, sleeve 22 slidably receives a second extension member in the form of a tube 24 which can be extended laterally past the right rear post 20. Both extension tubes 23 and 24 can be slidably retracted into sleeve 22 so as to project only very slightly beyond the respective ends of this tube.

A rear platform 25 (FIGS. 1 and 5) is rigidly attached to the left rear post 19 a short distance down from its upper end. Platform 25 rotatably supports one end of a supply roller 26 operated by a crank 27 on the left side. Roller 26 extends horizontally to the opposite side of the car, where that end of the roller is rotatably support by a similar platform attached to post 20. A flexible, sheet-like cover C of suitable fabric or plastic is normally wound on the supply roller 26 and can be unwound from it to cover the car, as described hereinafter.

Figures 6, 7:
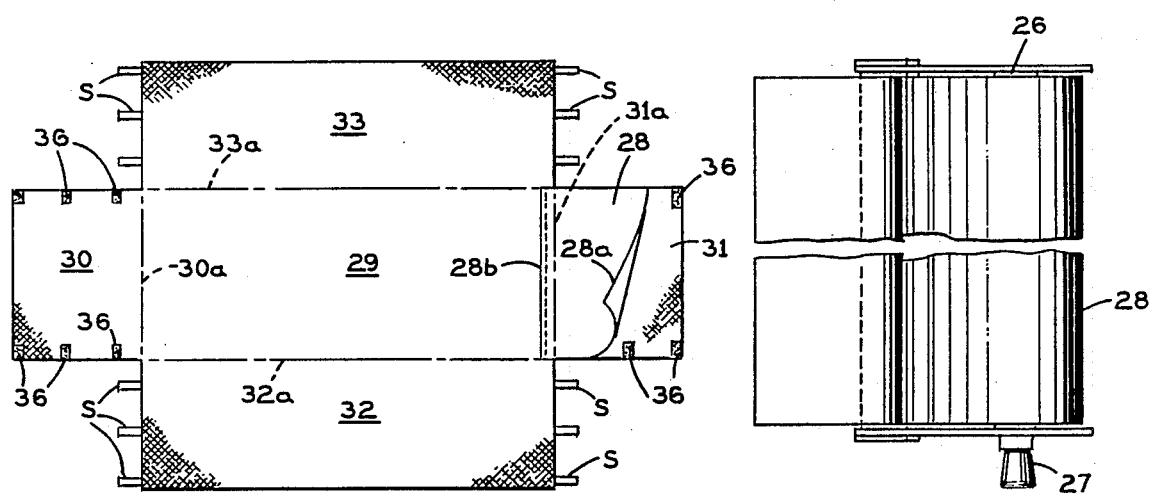
FIG. 6 is a top plan view.
FIG. 7 is a top plan view of the cover with its front and side flaps raised to substantially the level of its top segment.

As shown in FIG. 7, when completely unwound and laid flat, the cover C has a rectangular end segment 28 whose back edge 28a is fastened to the supply roller 26. End segment 28 has a width (from side-to-side of the car) just slightly less than the corresponding dimension of the supply roller 26. End segment 28 is rigidly attached at its front edge 28b to the one-piece main body of the cover, which has a rectangular central top segment 29 of the same width as the rear segment 28, a rectangular front flap segment 30 which is an extension of the top segment 29, a rectangular back flap segment 31 which is an extension of the top segment 29, a left side flap segment 32, and a right side flap segment 33. The front flap segment 30 is joined to the central top segment 29 along a fold line 30a extending laterally of the car.

The side flap segments 32 and 33 are joined to the top segment 29 along respective fold lines 32a and 33a extending longitudinally of the car. The back flap segment 31 is joined to the top segment 29 along a fold line 31a extending laterally of the car immediately behind the attachment of the end flap segment 28 to the top segment 29 of the cover.

When cover C is unwound from roller 26, the rear sleeve 22 and rear support posts 19 and 20 constitute a rear support means for the cover.

Figure 5:
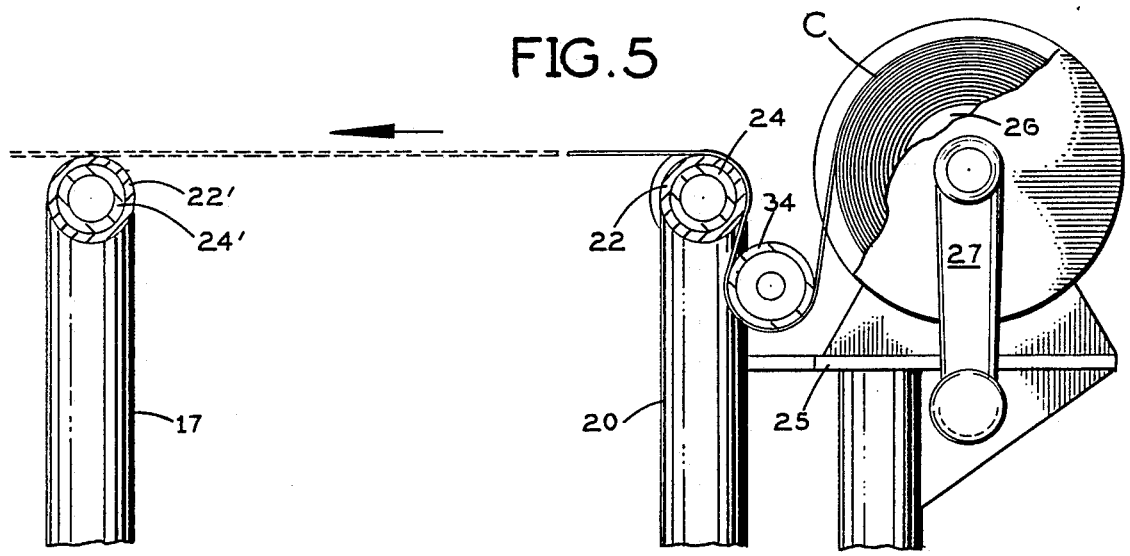
FIG. 5 is an enlarged side elevation showing the cover unwound from the supply roll at the back of the car.
Figure 11:
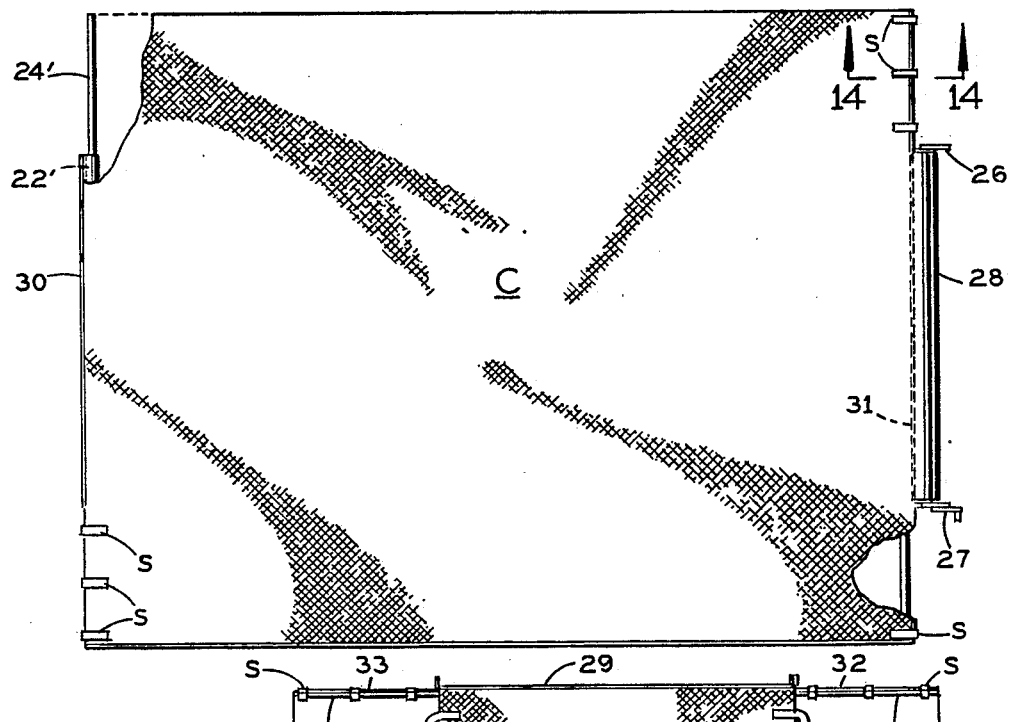
FIG. 11 is a view like FIG. 9 but with the side flaps of the cover raised.

The front posts 16 and 17 support a similar sleeve 22' at substantially the same level as rear sleeve 22. Posts 16 and 17 and sleeve 22' constitute a front support means for the cover C when it is pulled out from roller 26. Sleeve 22' slidably receives extension tubes, one of which is shown in FIGS. 5 and 11 as element 24'.

At its front edge the left side flap segment 32 of the cover carries a plurality of short, flexible straps S, each having a VELCRO hook-and-loop fastener strip 35 (FIG. 13) on the back. At its left edge the front flap segment 30 of the cover carries a like number of VELCRO hook-and-loop fastener pieces 36, each complementary to the fastener strip 35 such that when the two are brought together they provide a manually separable interlock. With this arrangement, when both flap segments 30 and 32 hang down, the front edge of side flap segment 32 may be positioned contiguous to the left edge of front flap segment 30 and the straps S on side flap segment may be pulled across the front of the front flap segment 30 to bring each VELCRO hook-and-loop fastener strip 35 into engagement with a correspondingly positioned VELCRO hook-and-loop fastener piece 36 on the front flap segment, thereby releasably attaching the left side flap segment 32 to the front flap segment 30 along this corner.

Figure 13:
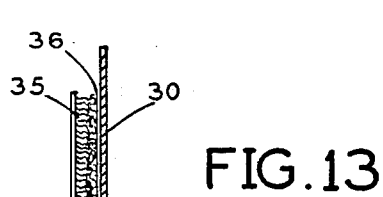
FIG. 13 is a fragmentary horizontal cross-section taken along the line 13—13 in FIG. 10 at the left front corner of the cover and showing one of the VELCRO hook-and-loop fasteners releasably attaching the left side flap to the front flap.

The left side flap segment 32 has similar straps S along its back edge which carry VELCRO hook-and-loop fastener strips like the one shown at 35 in FIG. 13, and the back flap segment 31 carries VELCRO hook-and-loop fastener pieces 36 along its left edge for interlocking, manually releasable engagement with the fastener strips on these straps. Therefore, the cover can be closed along this left rear corner in the manner already described for the left front corner.

The right side flap segment carries similar straps S along its front and rear edges, each with a VELCRO hook-and-loop fastener strip 35 on the back for interlocking, manually separable engagement with correspondingly positioned VELCRO hook-and-loop fastener pieces 36 along the right edges of the front flap segment 30 and the back flap segment 31.

When the cover C is completely wound up on the supply roll 26, its side flap segments 32 and 33 are folded under the top segment 29 along the respective fold lines 32a and 33a and its back flap segment 31 is face-to-face with the end segment 28 that connects the cover to roller 26. Therefore, in its wound-up condition the width of the cover C is the same as the width of its front flap segment 30, top segment 29, end segment 28 and back flap segment 31.

When the cover C is unwound from the supply roll, it passes under a horizontal idler roller 34 supported by platform 25 behind and below the rear sleeve 22, and then up across the top rear of sleeve 22 and forward horizontally above the car roof 15a to the front sleeve 22' (FIG. 5) attached to the upper ends of the front posts 16 and 17.

Figure 9:
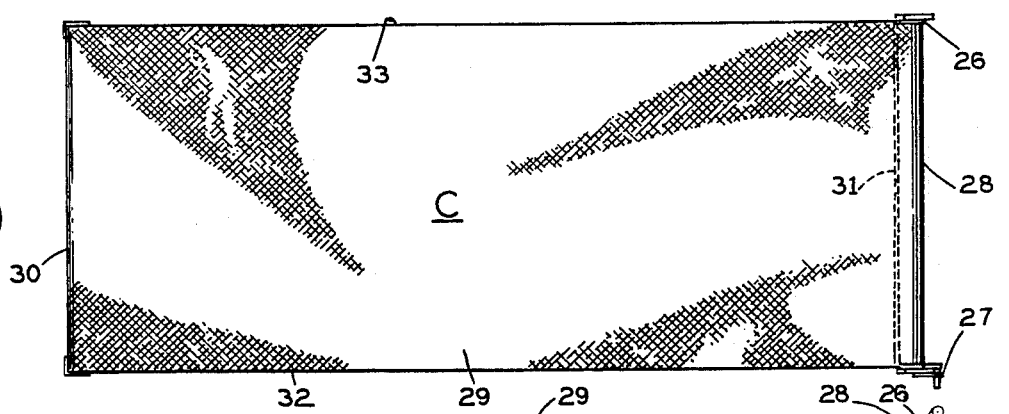
FIG. 9 is a top plan view showing the cover unwound from the supply roll at the back and covering the car across the top and down both sides, the front and the back.
Figure 10:
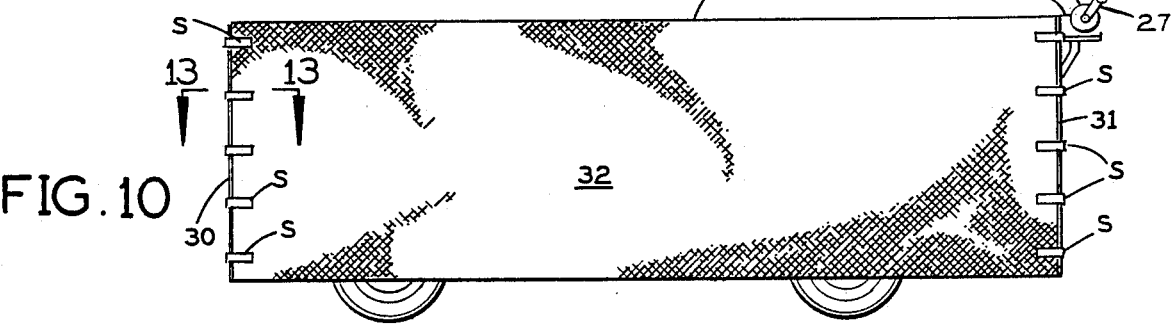
FIG. 10 is a side elevation showing the cover in the same position as in FIG. 9.

When the extension tubes are retracted into the rear and front sleeves 22 and 22', the cover can be pulled out to a position as shown in FIGS. 9 and 10, in which its central top segment 29 extends over the top of the car, its front flap segment 30 hangs down from the front sleeve 22' in front of the car, its back flap segment 31 hangs down from the rear sleeve 22 in back of the car, and its side flap segments 32 and 33 hang down on opposite sides of the car. The side flap segments 32 and 33 are attached to the front and back flap segments 30 and 31 by the straps S, as described, so that these flap segments and the top segment 29 form a five-sided rectangular enclosure covering the car body except at the bottom.

Figure 14:
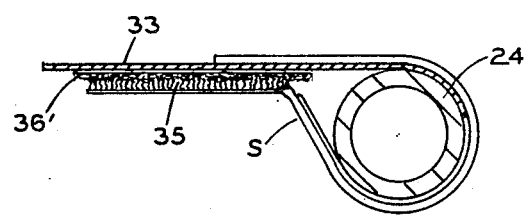
FIG. 14 is a fragmentary vertical cross-section taken along the line 14—14 in FIG. 11 and showing one of the VELCRO hook-and-loop fasteners attaching one of the raised side flaps of the cover to the laterally extended cover support at the right rear of the car.
Figure 12:
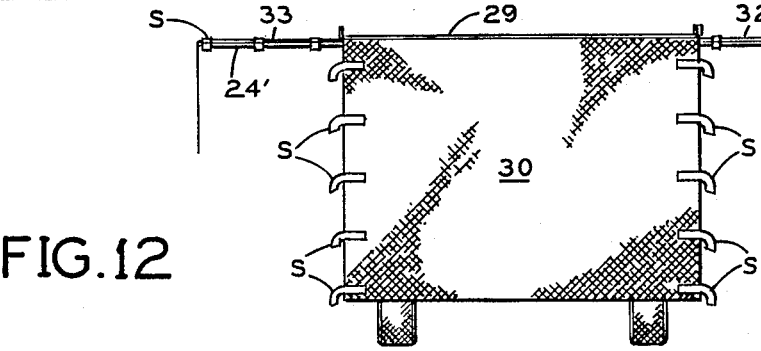
FIG. 12 is a front elevation of the arrangement shown in FIG. 11.

When the user wants access to the car from either side, the straps S on the ends of the side flap segments 32 and 33 may be separated from the front and back segments 30 and 31. With the extension tubes 23 and 24 pulled out from the rear sleeve 22 and the corresponding extension tubes pulled out from the front sleeve 22', the side flap segments 32 and 33 may be raised to extend substantially coplanar with the top segment 29, as shown in FIGS. 11 and 12. As shown in FIG. 14 for the right side segment 33, each side flap segment carries VELCRO hook-and-loop fastener pieces 36' on what is now the bottom face of that side flap segment. Each of these fastener pieces 36' is positioned for engagement by the VELCRO hook-and-loop fastener strip 35 on a corresponding strap S when that strap is wrapped down around the extended tube, as shown in FIG. 14 for the extension tube 24 which extends to the right from the rear sleeve 22 in FIG. 11. In this fashion, the raised side flaps 32 and 33 form lateral extensions of the top segment 29, for example, to shade the car while it is being washed and/or waxed.

From the foregoing detailed description and the accompanying drawings it will be evident that the present cover assembly is selectively convertible manually among (1) an inactive position in which the cover is folded and rolled up on the roller 26 at the back, (2) an active position (FIG. 2) in which the unwound cover forms a five-sided rectangular enclosure for the vehicle, and (3) an active position (FIGS. 11 and 12) in which the top segment 29 covers the top of the car from end to end and the side flap segments 32 and 33 are held up by the extension tubes at the front and rear sleeves to serve as lateral extensions of the top segment.

I claim:

1. A cover assembly for an automotive vehicle having a front end, a front bumper on said front end, a back end, a rear bumper on said back end, opposite sides, a top including a roof, and a passenger compartment, said cover assembly comprising:

a roller;

means for supporting said roller above the vehicle at one of said ends of the vehicle;

a flexible sheet-like cover having a top segment with a front end, a back end and opposite sides and dimensioned to cover the vehicle from end to end and from side to side, an end segment attaching said top segment to said roller, a front flap segment joined to said top segment at its front end and dimensioned to cover the front end of the vehicle from side to side when it hangs down from said top segment, a back flap segment joined to said top segment at its back end and dimensioned to cover the back end of the vehicle from side to side when it hangs down from said top segment, and opposite side flap segments joined respectively to said top segment along its opposite sides and dimensioned to cover the sides of the vehicle from end to end when they hang down from said top segment, each of said side flap segments having front and rear edges;

front support means for supporting said top segment of the cover above the vehicle at the juncture between said top segment and said front flap segment, said front support means comprising a tubular front sleeve having opposite ends and extending horizontally from side to side across the vehicle and means attachable to the front end of the vehicle to position said front sleeve above the top of the vehicle;

rear support means for supporting said top segment of the cover above the vehicle at the juncture between said top segment and said back flap segment, said rear support means comprising a tubular rear sleeve having opposite ends and extending horizontally from side to side across the vehicle and means attachable to the back end of the vehicle to position said rear support sleeve above the top of the vehicle;

fastener means for releasably attaching said side flap segments to said front and back segments to hold said cover in the form of a substantially rectangular enclosure covering the top, the opposite sides and the front and back ends of the vehicle, said fastener means comprising flexible straps at the front and rear edges of said side flap segments of the cover;

a pair of front extension members slidably received in said front sleeve and slidably extensible laterally beyond the opposite ends of said front sleeve;

a pair of rear extension members slidably received in said rear sleeve and slidably extensible laterally beyond the opposite ends of said rear sleeve;

and fastener elements on said side flap segments for interlocking engagement with said straps when (a) said front and rear extension members are extended laterally from said front and rear sleeves, (b) said side flap segments are detached from said front and back segments of the cover and raised to position their front and rear edges along said laterally extended front and rear extension members, and (c) said straps are wrapped around said extension members.

2. A cover assembly according to claim 1 wherein:

said roller is at the back end of the vehicle at a level higher than the roof;

said rear sleeve is in front of said roller;

and said end segment of the cover extends rearwardly from said top segment to said roller above said back flap segment of the cover.

3. A cover assembly according to claim 2 wherein:

said means to position said front sleeve above the top of the vehicle comprises front posts attachable to the front bumper on opposite sides of the vehicle;

and said means to position said rear sleeve above the top of the vehicle comprises rear posts attachable to the rear bumper on opposite sides of the vehicle.

4. A cover assembly for an automotive vehicle with a front end, a back end, opposite sides and a top, said cover assembly comprising:

a roller;

means for supporting said roller above the vehicle at one of said ends of the vehicle;

a flexible sheet-like cover having a top segment with a front end, a back end and opposite sides and dimensioned to cover the vehicle from end to end and from side to side, an end segment attaching said top segment to said roller, a front flap segment joined to said top segment at its front end and dimensioned to cover the front end of the vehicle from side to side when it hangs down from said top segment, a back flap segment joined to said top segment at its back end and dimensioned to cover the back end of the vehicle from side to side when it hangs down from said top segment, and opposite side flap segments joined respectively to said top segment along its opposite sides and dimensioned to cover the sides of the vehicle from end to end when they hang down from said top segment, each of said side flap segments having front and back edges;

front support means for supporting said top segment of the cover above the vehicle at the juncture between said top segment and said front flap segment, said front support means comprising a tubular front sleeve extending horizontally from side to side across the vehicle and having opposite ends, and support posts for said front sleeve attachable to the front end of the vehicle to position said front sleeve above the top of the vehicle;

rear support means for supporting said top segment of the cover above the vehicle at the juncture between said top segment and said back flap segment, said rear support means comprising a tubular sleeve extending horizontally from side to side across the vehicle and having opposite ends and support posts for said rear sleeve attachable to the back end of the vehicle to position said rear sleeve above the top of the vehicle;

fastener means for releasably attaching said side flap segments to said front and back segments to hold said cover in the form of a substantially rectangular enclosure covering the top, the opposite sides and the front and back ends of the vehicle, said fastener means comprising flexible straps extending from said side flap segments of the cover at their front and back edges, fabric fastener strips on said straps, and fabric fastener pieces on said front and back flap segments which interlock with said fastener strips on said straps when pressed thereagainst;

a pair of front extension members slidably received in said front sleeve and slidably extensible laterally beyond the opposite ends of said front sleeve;

a pair of rear extension members slidably received in said rear sleeve and slidably extensible laterally beyond the opposite ends of said rear sleeve;

and fabric fastener pieces on said side flap segments which interlock with said fabric fastener strips on said straps when (a) said front and rear extension members are extended laterally from said front and rear sleeves, (b) said side flap segments are detached from said front and back segments of the cover and raised to position their front and rear edges along said laterally extended front and rear extension members, and (c) said straps are wrapped around said extension members.

5. A cover assembly for an automotive vehicle having opposite ends and opposite sides, said cover assembly comprising:

a roller;

means for supporting said roller above the vehicle at one of said ends of the vehicle;

a flexible sheet-like cover having a central top segment having opposite sides and dimensioned to cover the vehicle from end to end and from side to side, an end segment attaching said top segment to said roller, and opposite side flap segments respectively having front and rear edges and joined respectively to said top segment along its opposite sides and dimensioned to cover the sides of the vehicle from end to end when they hang down from the top segment;

front support means for supporting the cover above the vehicle at the front edges of said side flap segments, said front support means being selectively adjustable to extend laterally beyond the opposite sides of the vehicle;

rear support means for supporting the cover above the vehicle at the rear edges of said side flap segments, said rear support means being selectively adjustable to extend laterally beyond the opposite sides of the vehicle;

and fastener means for releasably attaching said side flap segments to said front and rear support means when said front and rear support means are laterally extended and said side flap segments are raised to substantially the level of said top segment.

6. A cover assembly according to claim 5 wherein said fastener means comprises:

flexible straps extending from said side flap segments of the cover at their front and rear edges;

fabric fastener strips on said straps;

and fabric fastener pieces on said side flap segments which interlock with said fabric fastener strips on said straps when (a) said front support means and said rear support means are extended laterally, (b) said side flap segments are raised to position their front and rear edges along said laterally extended front and rear support means, and (c) said straps are wrapped around said laterally extended front and rear support means.

7. A cover assembly according to claim 6 wherein:

said front support means comprises a tubular front sleeve having opposite ends and a pair of front extension members slidably received in said front sleeve and slidably extensible laterally beyond the opposite ends of said front sleeve;

and said rear support means comprises a tubular rear sleeve having opposite ends and a pair of extension members slidably received in said rear sleeve and slidably extensible laterally beyond the opposite ends of said rear sleeve.

* * * * *